US011189008B2

(12) United States Patent
Kawai (10) Patent No.: US 11,189,008 B2
(45) Date of Patent: Nov. 30, 2021

(54) IMAGE CAPTURE APPARATUS FOR PANORAMIC PHOTOGRAPHY, METHOD OF CONTROLLING SAME, AND STORAGE MEDIUM

(71) Applicant: CANON KABUSHIKI KAISHA, Tokyo (JP)

(72) Inventor: Yusuke Kawai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/548,935

(22) Filed: Aug. 23, 2019

(65) Prior Publication Data

US 2020/0074586 A1 Mar. 5, 2020

(30) Foreign Application Priority Data

Aug. 30, 2018 (JP) .............................. JP2018-161686

(51) Int. Cl.
*G06K 9/00* (2006.01)
*G06T 3/00* (2006.01)
(Continued)

(52) U.S. Cl.
CPC .............. *G06T 3/0043* (2013.01); *G06T 3/20* (2013.01); *G06T 5/003* (2013.01); *G06T 5/006* (2013.01);
(Continued)

(58) Field of Classification Search
CPC ......... G06T 3/0043; G06T 3/20; G06T 5/003; G06T 2207/20092; G06T 5/50; G06T 2207/20212; G06T 2207/30181; G06T 5/006; G06T 3/4038; G06T 11/60; G06K 9/48; G06K 9/4604; G06K 9/643;
(Continued)

(56) References Cited

U.S. PATENT DOCUMENTS 5,045,872 A * 9/1991 Yoshimura ............. G03B 37/02
396/20
5,255,030 A * 10/1993 Mukai .................... G03B 7/091
396/20
(Continued)

FOREIGN PATENT DOCUMENTS

JP       2005-303594 A    10/2005

*Primary Examiner* — Amir Alavi
(74) *Attorney, Agent, or Firm* — Cowan, Liebowitz & Latman P.C.

(57) ABSTRACT

An image capture apparatus capable of eliminating wasteful photographing in predetermined panoramic photography. Predetermined panoramic photography combines images acquired by repeating still image capturing with long time-exposure and panning. A first angle of view in panning direction indicates an angle from a start to an end point in the photography. A photographing condition is calculated based on the first angle and a focal length of a photographic lens, and displayed changeable by a user. When combining the images, geometric deformation processing is performed thereon for changing a second angle of view indicative of an angle of view in a direction orthogonal to the panning direction according to the focal length. The second angle changed by the processing is calculated according to the set first angle and the displayed photographing condition. The second angle is displayed before and after the change.

13 Claims, 8 Drawing Sheets

(51) Int. Cl.
*G06T 3/20* (2006.01)
*G06T 5/00* (2006.01)
*G06T 5/50* (2006.01)

(52) U.S. Cl.
CPC ...... *G06T 5/50* (2013.01); *G06T 2207/20092* (2013.01); *G06T 2207/20212* (2013.01); *G06T 2207/30181* (2013.01)

(58) Field of Classification Search
CPC ........ G06K 9/52; H04N 5/23238; H04N 5/50; H04N 7/26643; H04N 1/3876
See application file for complete search history.

(56) References Cited

U.S. PATENT DOCUMENTS

| | | | | |
|---|---|---|---|---|
| 5,315,331 A | * | 5/1994 | Ohshita | G02B 13/06 396/20 |
| 5,353,077 A | * | 10/1994 | Tanaka | G03B 1/50 396/378 |
| 5,526,080 A | * | 6/1996 | Cho | G03B 1/50 396/380 |
| 6,091,904 A | * | 7/2000 | Kobayashi | G03B 27/40 359/821 |
| 6,532,037 B1 | * | 3/2003 | Shimura | G06T 3/4038 348/36 |
| 7,221,395 B2 | * | 5/2007 | Kinjo | H04N 5/23293 348/239 |
| 7,856,180 B2 | * | 12/2010 | Chishima | H04N 13/239 396/324 |
| 8,164,641 B2 | * | 4/2012 | Kawakatsu | G06T 3/4038 348/218.1 |
| 10,694,115 B2 | * | 6/2020 | Li | H04N 21/44218 |
| 2020/0074586 A1 | * | 3/2020 | Kawai | H04N 5/232939 |
| 2020/0186710 A1 | * | 6/2020 | Sheikh | H04N 5/3415 |

* cited by examiner

IMAGE CAPTURE APPARATUS FOR PANORAMIC PHOTOGRAPHY, METHOD OF CONTROLLING SAME, AND STORAGE MEDIUM

BACKGROUND OF THE INVENTION

Field of the Invention

The present invention relates to an image capture apparatus, a method of controlling the same, and a storage medium, and more particularly to an image capture apparatus for predetermined panoramic photography, a method of controlling the same, and a storage medium.

Description of the Related Art

Conventionally, it is known that starlit-sky panoramic photography is made possible by performing long time-exposure photography with increased exposure time for still image capturing, for stitched panoramic photography in which a plurality of still images are captured by alternately repeating still image capturing and panning an image capture apparatus and the captured images are stitched (combined) into a panoramic image.

On the other hand, in starlit-sky panoramic photography, it is necessary to execute long time-exposure photography a plurality of times as mentioned above, which requires a long time from the start to the end thereof, and hence it is required to eliminate wasteful photographing and reduce time to complete the starlit-sky panoramic photography.

To eliminate wasteful photographing in stitched panoramic photography, Japanese Laid-Open Patent Publication (Kokai) No. 2005-303594 discloses a method of assisting a user such that the number of captured images is neither excessive nor insufficient. More specifically, the number of images required to be captured with overlapping portions between each adjacent images is calculated using image capturing angles of view changed by zooming to desired angles about a photographer. After that, the image capture apparatus is shifted to a photographing mode, and the progress of photographing is notified to the user by comparing the number of captured images and the calculated required number of images.

Further, it is also known that in stitched panoramic photography, it is possible to more reduce wasteful photographing by making narrower the overlapping areas between the plurality of still images to be combined.

However, if the overlapping areas between the plurality of still images are made narrower, it is necessary to perform geometric deformation processing for aligning positions of the images and combining the images with high accuracy, and an angle of view orthogonal to a direction of the panning, which can be used for combining, is narrowed due to the geometric transformation processing. The above-mentioned angle of view is hereinafter referred to as the combining effective angle of view.

The method disclosed in Japanese Laid-Open Patent Publication (Kokai) No. 2005-303594 does not take this problem into consideration, and hence if starlit-sky panoramic photography performed using this method makes the combining effective angle of view narrower than an angle of view desired by a user, all of the photographing operations in the starlit-sky panoramic photography become useless.

SUMMARY OF THE INVENTION

The present invention provides an image capture apparatus that is capable of eliminating wasteful photographing in predetermined panoramic photography, a method of controlling the same, and a storage medium.

In a first aspect of the present invention, there is provided an image capture apparatus that performs predetermined panoramic photography in which a plurality of images acquired by repeating still image capturing with long time-exposure and panning are combined, comprising at least one memory that stores a set of instructions, and at least one processor that executes the instructions, the instructions, when executed, causing the image capture apparatus to perform operations comprising setting a first angle of view in a direction of the panning, which indicates an angle from a start point to an end point in the predetermined panoramic photography, calculating an photographing condition in the predetermined panoramic photography based on the first angle of view and a focal length of a photographic lens, displaying the photographing condition such that the photographing condition can be changed by a user, performing, when combining the plurality of images images, geometric deformation processing thereon, for changing a second angle of view which indicates an angle of view in a direction orthogonal to the direction of the panning, according to the focal length of the photographic lens, calculating the second angle of view after the change to be performed by the geometric deformation processing according to the set first angle of view and the displayed photographing condition, and displaying the second angle of view before and after the change.

In a second aspect of the present invention, there is provided a method of controlling an image capture apparatus that performs predetermined panoramic photography in which a plurality of images acquired by repeating still image capturing with long time-exposure and panning are combined, comprising setting a first angle of view in a direction of the panning, which indicates an angle from a start point to an end point in the predetermined panoramic photography, calculating an photographing condition in the predetermined panoramic photography based on the first angle of view and a focal length of a photographic lens, displaying the photographing condition such that the photographing condition can be changed by a user, performing, when combining the plurality of images images, geometric deformation processing thereon, for changing a second angle of view which indicates an angle of view in a direction orthogonal to the direction of the panning, according to the focal length of the photographic lens, calculating the second angle of view after the change to be performed by the geometric deformation processing according to the set first angle of view and the displayed photographing condition, and displaying the second angle of view before and after the change.

In a third aspect of the present invention, there is provided a non-transitory computer-readable storage medium storing a computer-executable program for executing a method of controlling an image capture apparatus that performs predetermined panoramic photography in which a plurality of images acquired by repeating still image capturing with long time-exposure and panning are combined, wherein the method comprises setting a first angle of view in a direction of the panning, which indicates an angle from a start point to an end point in the predetermined panoramic photography, calculating an photographing condition in the predetermined panoramic photography based on the first angle of view and a focal length of a photographic lens, displaying the photographing condition such that the photographing condition can be changed by a user, performing, when combining the plurality of images images, geometric deformation processing thereon, for changing a second angle of view which indicates an angle of view in a direction orthogonal to the direction of the panning, according to the focal length of the photographic lens, calculating the second angle of view after the change to be performed by the geometric deformation processing according to the set first angle of view and the displayed photographing condition, and displaying the second angle of view before and after the change.

According to the present invention, it is possible to eliminate wasteful photographing in predetermined panoramic photography.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
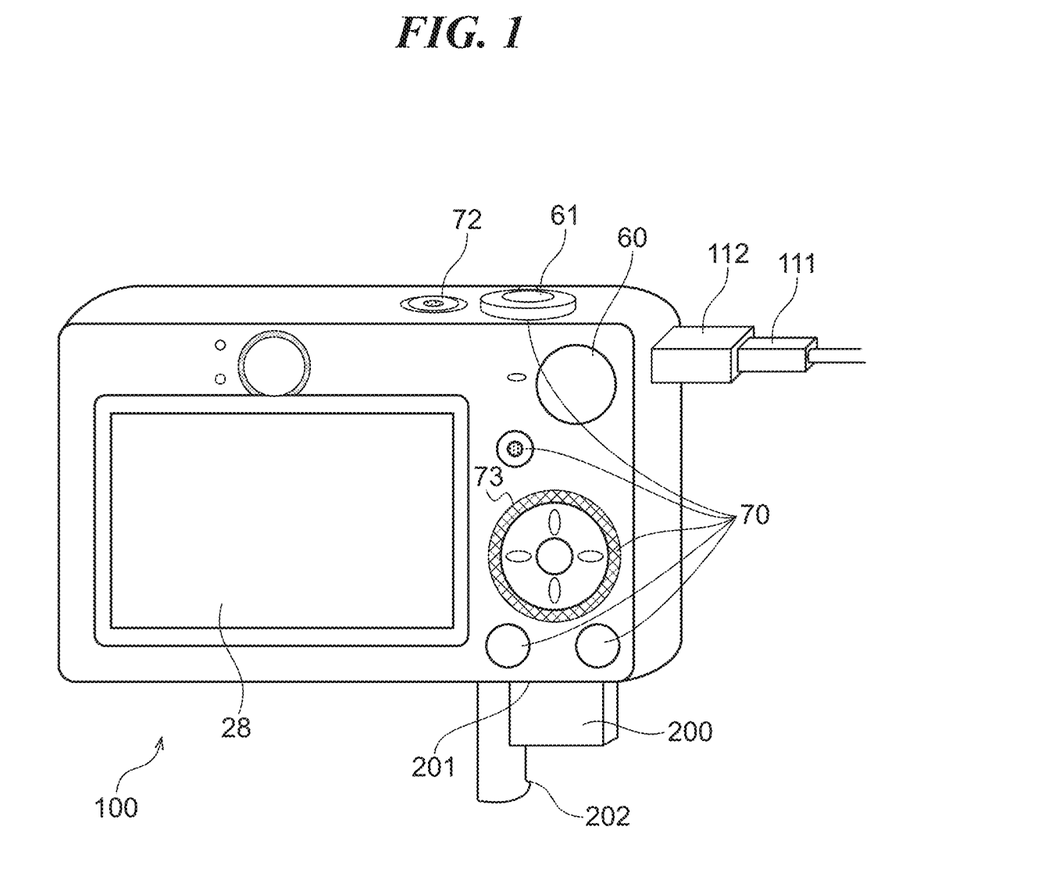
FIG. 1 is a view of the appearance of a digital camera as an image capture apparatus according to an embodiment of the present invention, as viewed from the rear.

FIG. 1 is a view of the appearance of a digital camera 100 as an image capture apparatus according to an embodiment of the present invention, as viewed from the rear.

Referring to FIG. 1, the digital camera 100 has a display section 28, a mode changing switch 60, a shutter button 61, an operation section 70, a connector 112, a recording medium slot 201, and a cover 202, provided on the rear surface thereof.

The display section 28 displays an image and various information.

The mode changing switch 60 is for changing between various modes. Details of the mode changing switch 60 will be described hereinafter with reference to FIG. 2.

The shutter button 61 is for inputting a photographing instruction. Details of the shutter button 61 will be described hereinafter with reference to FIG. 2.

The operation section 70 is comprised of operation members for receiving various operations from a user, such as various switches, buttons, and a touch panel. More specifically, the operation section 70 includes a controller wheel 73 as an operation member which can be operated for rotation, a power switch 72 for switching between power-on and power-off, and so forth. Details of the operation section 70 will be described hereinafter with reference to FIG. 2.

The connector 112 is for connecting between a connection cable 111 and the digital camera 100.

The recording medium slot 201 receives, when the cover 202 is open, a recording medium 200 implemented by a semi-conductor memory, a magnetic disk, or the like, such as a memory card or a hard disk. The recording medium 200 accommodated in the recording medium slot 201 is capable of performing communication with the digital camera 100.

Figure 2:
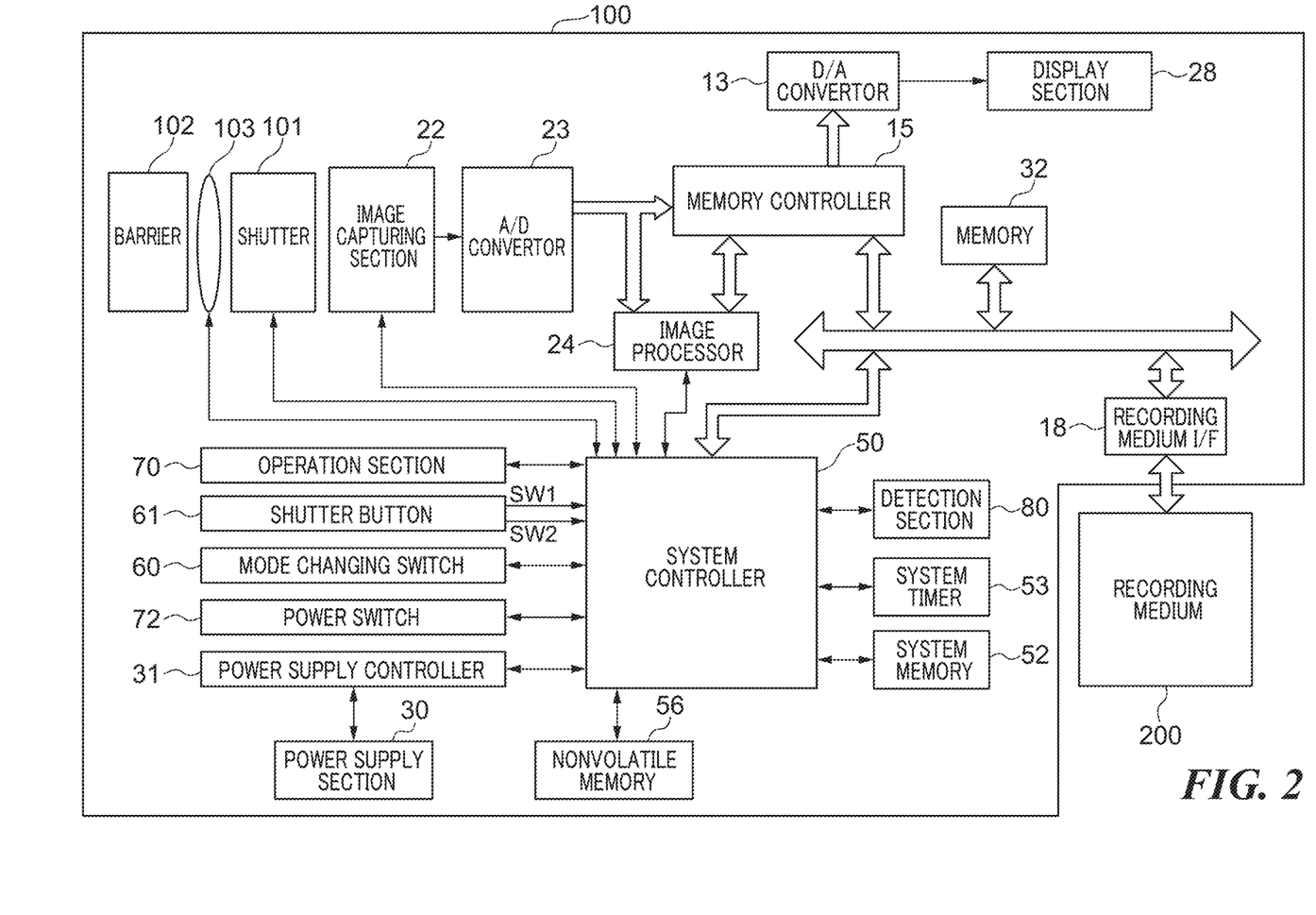
FIG. 2 is a block diagram showing a hardware configuration of the digital camera shown in FIG. 1.

FIG. 2 is a block diagram showing a hardware configuration of the digital camera 100 shown in FIG. 1.

Referring to FIG. 2, the digital camera 100 includes not only the components appearing in FIG. 1, but also a shutter 101, a photographic lens 103, an image capturing section 22, an analog-to-digital convertor 23, a barrier 102, an image processor 24, a memory controller 15, a system controller 50, a memory 32, and a digital-to-analog convertor 13. The digital camera 100 further includes a nonvolatile memory 56, a system memory 52, a system timer 53, a power supply controller 31, a power supply section 30, a recording medium interface 18, and a detection section 80.

The shutter 101 is a focal plane shutter. By using the shutter 101, it is possible to control exposure time for image capturing.

The photographic lens 103 is a lens group including a zoom lens and a focus lens.

The image capturing section 22 is an image capture device implemented e.g. by a CCD or CMOS device that converts an optical image to electric signals and thereby outputs image data.

The analog-to-digital convertor 23 converts image data output from the image capturing section 22 from analog data to digital data. The data output from the analog-to-digital convertor 23 is written into the memory 32 via the image processor 24 and the memory controller 15, or via the memory controller 15 without via the image processor 24.

The barrier 102 covers the image capturing system of the digital camera 100, including the photographic lens 103, the shutter 101, and the image capturing section 22, to thereby prevent the image capturing system from getting soiled and damaged.

The image processor 24 performs predetermined pixel interpolation, face detection, resize processing, such as size reduction, and color conversion processing, on image data output from the analog-to-digital convertor 23 or the memory controller 15. Further, the image processor 24 performs predetermined calculation processing using image data captured by the image capturing section 22, and the system controller 50 performs exposure control and ranging control based on the result of calculation. Through the exposure control and the ranging control, AF (auto focus) processing by the TTL (through the lens) method and AE (auto exposure) processing are performed. Further, the image processor 24 performs predetermined calculation processing using image data captured by the image capturing section 22, and also performs AWB (auto white balance) processing by the TTL method based on the result of calculation. Further, the image processor 24 performs stitched panoramic photography for generating a wide-angle combined image (panoramic image) by combining a plurality of images captured by repeating still image capturing and panning. In the present embodiment, in this stitched panoramic photography, as described hereinafter with reference to FIG. 3, the image processor 24 performs, when combining a plurality of captured images, geometric deformation processing thereon, for changing an angle of view in a direction orthogonal to a direction of the panning according to a focal length of the photographic lens 103.

The memory 32 stores image data which is output from the image capturing section 22 and converted to digital data by the analog-to-digital convertor 23, and stores data for image display, which is to be displayed on the display section 28. That is, the memory 32 has a sufficient storage capacity to store a predetermined number of still images and a predetermined time length of moving images and voices.

The digital-to-analog convertor 13 converts data for image display, stored in the memory 32, to analog data, and supplies the analog data to the display section 28. Thus, the data for image display, written in the memory 32, is displayed by the display section 28 via the digital-to-analog convertor 13.

The display section 28 is provided with a display device, such as an LCD, and performs display based on analog data supplied from the digital-to-analog convertor 13. The image data output from the image capturing section 22, which was converted from analog to digital by the analog-to-digital convertor 23 and stored in the memory 32, is converted from digital to analog by the digital-to-analog convertor 13 and sequentially transferred to the display section 28. With this, the display section 28 functions as an electronic viewfinder and is capable of performing through-image display.

The nonvolatile memory 56 is an electrically erasable/recordable memory and is implemented e.g. by an EEPROM or the like. The nonvolatile memory 56 stores constants for the operation of the system controller 50, programs, and so forth. The programs referred to here include programs for executing various processes, some of which will be described hereinafter with reference to flowcharts shown in FIGS. 3 and 4.

The system controller 50 controls the overall operation of the digital camera 100. The system controller 50 realizes the processes, described hereinafter with reference to FIGS. 3 and 4, by executing the above-mentioned programs stored in the nonvolatile memory 56. Further, the system controller 50 also performs display control by controlling the memory 32, the digital-to-analog convertor 13, the display section 28, and so forth.

The system memory 52 is implemented by a RAM for loading therein the constants for the operation of the system controller 50, variables, the programs read out from the nonvolatile memory 56, and so forth.

The system timer 53 is a time measurement section that measures time used for various control using a counter incorporated therein.

The mode changing switch 60, the shutter button 61, and the operation section 70 are operation means for inputting various operation instructions to the system controller 50.

The mode changing switch 60 switches the operation mode of the system controller 50 to one of a still image photography mode, a moving image photography mode, a reproduction mode, and so forth. The still image photography mode includes an automatic photography mode, an automatic scene determination mode, a manual mode, various scene modes configured on a photography scene-by-photography scene basis, a program AE mode, a panoramic photography mode including a starlit-sky panoramic photography mode, a custom mode, etc. The operation mode can be directly switched to one of these modes included in the still image photography mode by using the mode changing switch 60. Alternatively, after being switched to the still image photography mode once by using the mode changing switch 60, the operation mode may be switched to one of the above-mentioned modes included in the still image photography mode by using another operation member. Similarly, a plurality of modes may be included in the moving image photography mode.

The shutter button 61 generates a SW1 signal indicative of reception of a photographing preparation instruction when the shutter button 61 is half-pressed by a user, and sends the SW1 signal to the system controller 50. Upon receipt of the SW1 signal, the system controller 50 starts operations of AF (auto focus) processing, AE (auto exposure) processing, AWB (auto white balance) processing, and so forth. Further, the shutter button 61 generates a SW2 signal indicative of reception of a photographing instruction when the shutter button 61 is fully pressed. Upon receipt of the SW2 signal, the system controller 50 starts a series of operations of photographing from outputting image data from the image capturing section 22 to writing the image data into the recording medium 200. When starting photographing in response to detection of the SW2 signal, whether or not to operate the shutter 101 may be switched according to the settings.

The operation members of the operation section 70 each have a function appropriately allocated thereto, on a scene-by-scene basis, through selective operation of various function icons displayed on the display section 28, whereby the operation members function as various function buttons. Examples of the function buttons include an end button, a return button, an image feeding button, a jump button, an iris refining button, and an attribute change button. For example, when a menu button is pressed, a menu screen on which various settings can be set is displayed on the display section 28. A user can intuitively configure various settings using the menu screen displayed on the display section 28, a four-direction button for designating any of the four directions of up, down, right, and left, and a SET button.

The controller wheel 73 (see FIG. 1) is an operation member which is included in the operation section 70 and can be operated for rotation, and is used in cooperation with the four-direction button. e.g. for designating a selected item. When the controller wheel 73 is rotated, an electric pulse signal is generated according to an amount of operation of the controller wheel 73, and the system controller 50 controls the components of the digital camera 100 based on the pulse signal. With this pulse signal, it is possible to determine an angle through which the controller wheel 73 is rotated and the number of times of rotation. Note that the controller wheel 73 may be any type of an operation member, insofar as it is capable of detecting a rotational operation. For example, the controller wheel 73 may be a dial operation member configured such that the controller wheel 73 itself rotates and generates a pulse signal according to a user's rotation operation. Further, the controller wheel 73 may be comprised of a touch sensor, such as a so-called touch wheel, which does not rotate itself but is configured to detect e.g. a rotational operation of a user's finger on the controller wheel 73.

The power supply controller 31 is comprised of a battery detection circuit, a DC-DC convertor, and a switch circuit for switching blocks to be energized, and detects attachment/non-attachment, a type, a remaining battery capacity, and for forth, of the power supply section 30. Further, the power supply controller 31 controls the DC-DC convertor based on a result of the detection and an instruction from the system controller 50 to supply required voltage to the components including the recording medium 200 for a required time period.

The power supply section 30 is formed by a primary battery, such as an alkaline battery or a lithium battery, a secondary battery, such as an NiCd battery, an NiMH battery, or an Li battery, or an AC adapter or the like.

The recording medium interface 18 provides interface with the recording medium 200.

The detection section 80 is comprised of sensors, such as a gyro sensor and an acceleration sensor. The system controller 50 calculates angles and an amount of movement of the main body of the digital camera 100 based on detection results output from the detection section 80. For example, in a case where the detection section 80 outputs an angular speed as a detection result, the system controller 50 calculates an angle by integrating the detection result over time, and further calculates a position by integrating the calculated angle over time. The output from the sensor forming the detection section 80 is sometimes unstable, causing the detection result to be output in a state in which an offset is added to the angular speed, and hence, a high-pass filter is applied to the detection section 80, whereby a value obtained by eliminating the offset is used as the detection result output from the detection section 80.

Figure 8:
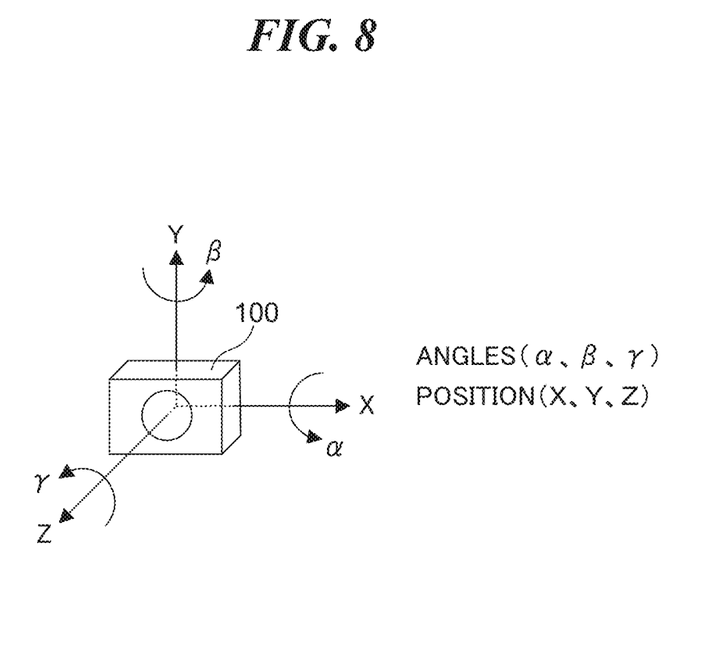
FIG. 8 is a diagram showing angles and a position of a main body of the digital camera in a coordinate system, which are calculated based on a result of detection performed by a detection section appearing in FIG. 2.

FIG. 8 is a diagram showing angles and a position of the main body of the digital camera 100 in a coordinate system, which are calculated based on a result of detection performed by the detection section 80 appearing in FIG. 2.

The system controller 50 calculates the angles ($\alpha$, $\beta$, $\gamma$) and the position (X, Y, Z) of the main body of the digital camera 100 with respect to three axes, respectively, based on a result of the detection output from the detection section 80 appearing in FIG. 2. Further, the system controller 50 calculates the angles and the position as relative values to the reference values. For example, the system controller 50 sets angles and a position indicated by a detection result output from the detection section 80 synchronized with the first photographing operation after the digital camera 100 is powered on by the power switch 72, to the angles (0°, 0°, 0°) and the position (0, 0, 0) as the reference values. After calculating the reference values, the system controller 50 calculates the angles and the position of the digital camera 100 as relative values to the reference values.

Although in FIG. 2, the digital camera 100 is formed by integrating the photographic lens 103 and the detection section 80 with the digital camera 100, these components may be removable from the main body of the digital camera 100 and interchangeable with other photographic lens and detection section.

Next, the starlit-sky panoramic photography mode according to the present embodiment will be described.

In the starlit-sky panoramic photography mode, a plurality of still images are captured by repeating long time-exposure photography in which the exposure time for capturing a still image is made longer than in the normal stitched panoramic photography and panning of the digital camera 100, and the thus acquired still images are combined. Further, a user can switch to and switch from this mode, by using the mode changing switch 60. Thus, in the starlit-sky panoramic photography mode, long time-exposure photography is performed, and hence, the digital camera 100 is set on a tripod, not shown in FIGS. 1 and 2.

Figure 3:
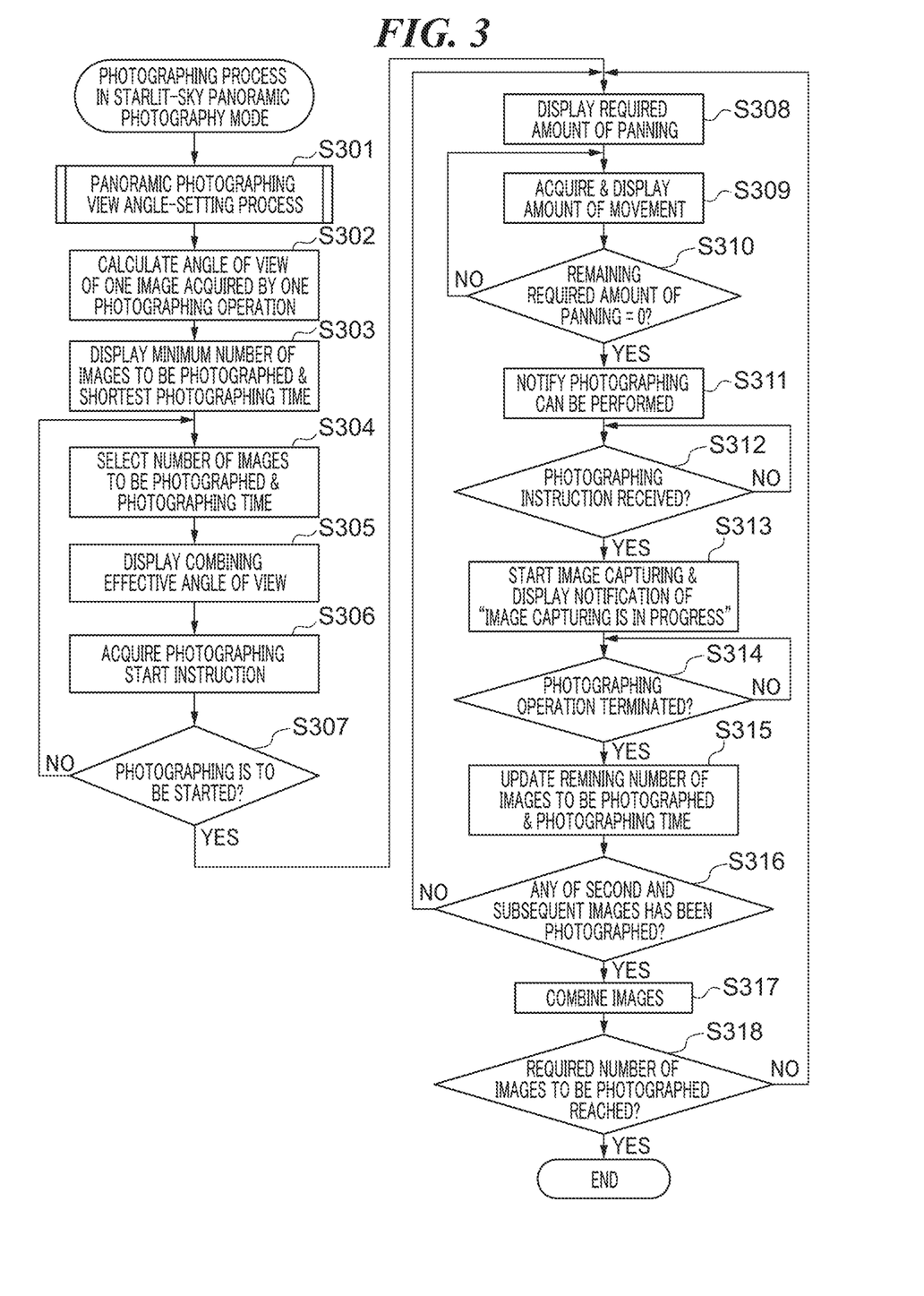
FIG. 3 is a flowchart of a photographing process in a starlit-sky panoramic photography mode, which is performed by a system controller appearing in FIG. 2.

FIG. 3 is a flowchart of a photographing process performed by the system controller 50 in the starlit-sky panoramic photography mode. The photographing process in FIG. 3 is executed in a case where the starlit-sky panoramic photography mode is selected by the mode changing switch 60.

The system controller 50 performs a panoramic photographing view angle-setting process (step S301). The panoramic photographing view angle-setting process sets a panoramic photographing angle of view 501 indicative of an angle from a start point 502 to an end point 503 in panoramic photography as shown in FIG. 5. In this process, the panoramic photographing angle of view 501 may be set according to user's selection of the panoramic photographing angle of view 501 itself, or may be set according to user's selection of the start point 502 and the end point 503. Details of the latter case will be described with reference to FIG. 4.

Figure 4:
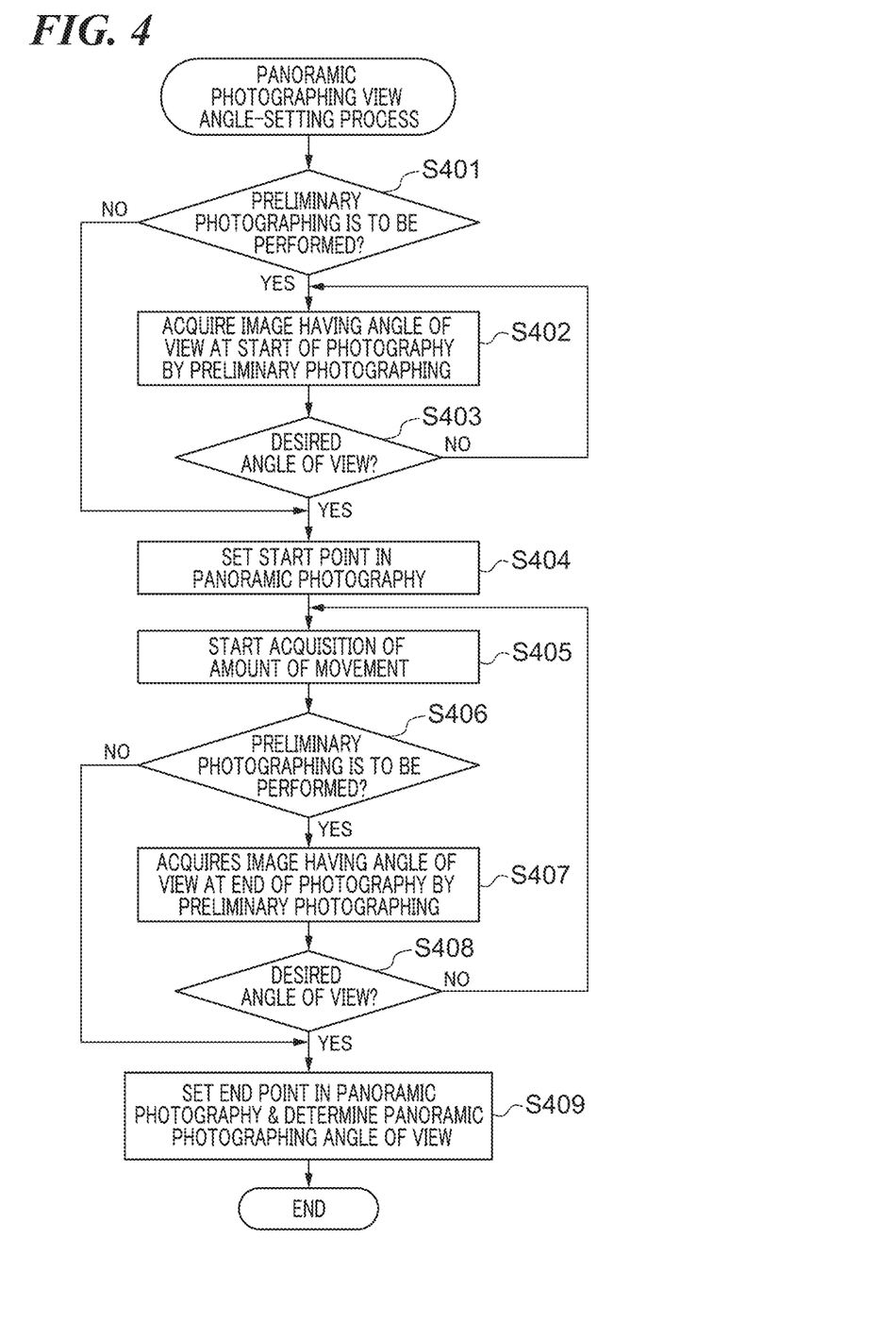
FIG. 4 is a flowchart of a panoramic photographing view angle-setting process performed by the system controller in a step in FIG. 3.
Figure 5:
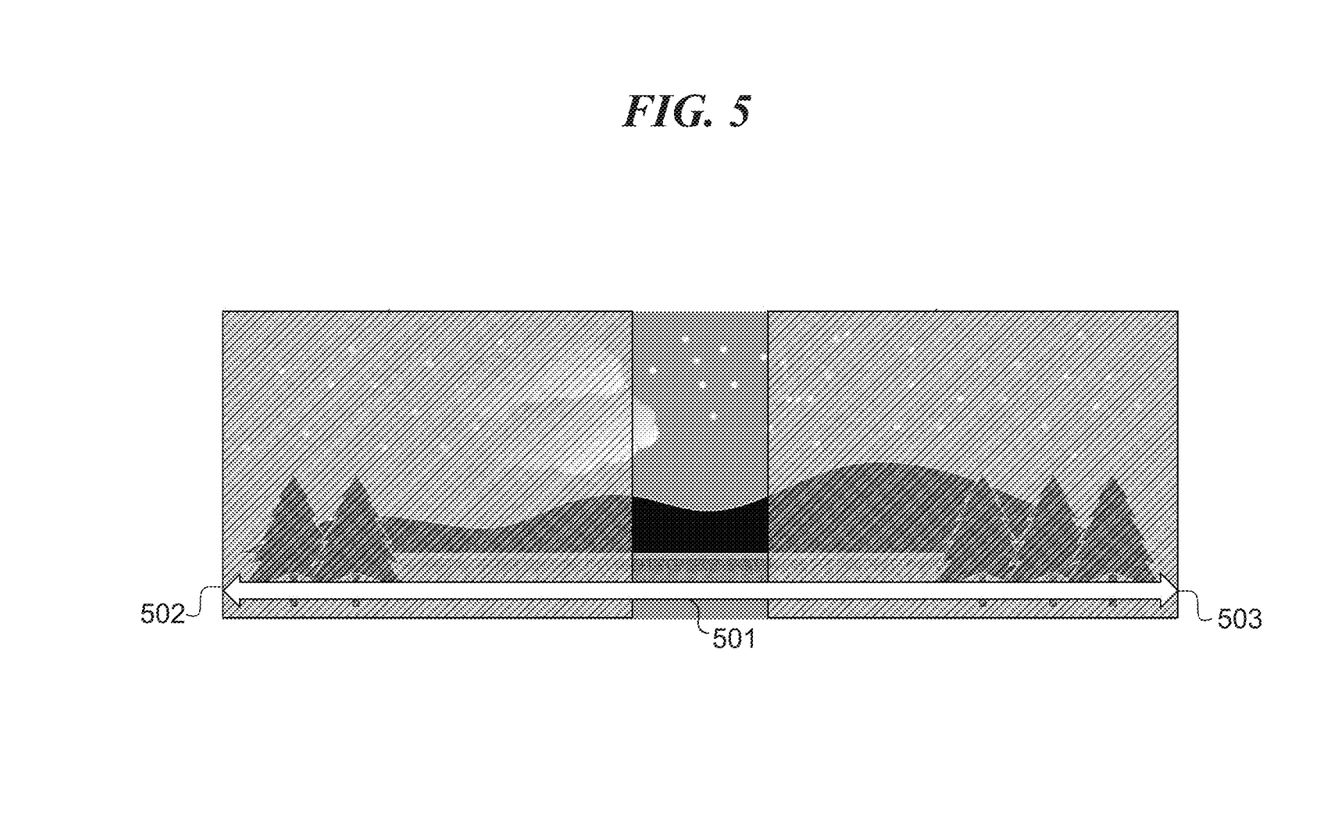
FIG. 5 is a view useful in explaining a panoramic photographing angle of view set in the panoramic photographing view angle-setting process performed in the step in FIG. 3.

FIG. 4 is a flowchart of the panoramic photographing view angle-setting process performed by the system controller 50 in the step S301 in FIG. 3. As mentioned above, in this process, the panoramic photographing angle of view 501 is set according to user's selection of the start point 502 and the end point 503.

First, the system controller 50 determines whether or not to perform preliminary photographing for determining the start point 502 in panoramic photography (step S401). If it is determined that preliminary photographing for determining the start point 502 is to be performed, the system controller 50 proceeds to a step S402, whereas if it is determined that preliminary photographing is not to be performed, the system controller 50 directly proceeds to a step S404.

In the step S402, an image having an angle of view at the start of panoramic photography is acquired by preliminary photographing. The image acquired by the preliminary photographing may be used as the first image to be combined in a step S317 in FIG. 3. In this case, photographing for acquiring the first image, which is executed in a step S311, et seq. in FIG. 3, described hereinafter, is omitted.

Then, in a step S403, the system controller 50 determines whether or not the image acquired by the preliminary photographing in the step S402 is an image having an angle of view, desired by the user. The method of this determination is not particularly limited. For example, this determination may be performed by detecting whether or not the user has performed a predetermined operation on the operation section 70. Alternatively, this determination may be performed by detecting whether or not the digital camera 100 has been moved before a predetermined time period elapses after acquisition of the image in the step S402.

If it is determined in the step S403 that the captured image is the image having the angle of view, desired by the user, the system controller 50 proceeds to the step S404, whereas if not, the system controller 50 returns to the step S402.

In the step S404, a left end of the image acquired by the preliminary photographing in the step S402 is set and stored as the start point 502 in panoramic photography. Note that in a case where it is determined in the step S401 that preliminary photographing is not to be performed and the process proceeds directly to the step S404, the system controller 50 sets and stores the start point 502 in panoramic photography according to a user's instruction input by using the operation section 70.

Then, the system controller 50 starts to acquire an amount of movement of the digital camera 100 (step S405).

Then, the system controller 50 determines whether or not to perform preliminary photographing for determining the end point 503 in panoramic photography (step S406). If it is determined that preliminary photographing for determining the end point 503 is to be performed, the system controller 50 proceeds to a step S407, whereas if it is determined that preliminary photographing is not to be performed, the system controller 50 directly proceeds to a step S409.

In the step S407, the system controller 50 acquires an image having an angle of view at the end of panoramic photography by preliminary photographing. This image acquired by the preliminary photographing may be used as the last image to be combined in the step S317 in FIG. 3. In this case, photographing for acquiring the last image, which is executed in the step S311 et seq. in FIG. 3, is omitted.

Then, in a step S408, the system controller 50 determines whether or not the image acquired by the preliminary photographing in the step S407 is an image having an angle of view desired by the user. This determination is performed in the same manner as the determination in the step S403.

If it is determined in the step S408 that the acquired image is the image having the angle of view desired by the user, the system controller 50 proceeds to the step S409, whereas if not, the system controller 50 returns to the step S405.

In the step S409, a right end of the image acquired by the preliminary photographing in the step S407 is set and stored as the end point 503 in panoramic photography. Further, the system controller 50 determines an amount of movement of the digital camera 100, which is acquired in the steps S405 to S409, as the panoramic photographing angle of view 501, followed by terminating the present process. Note that in a case where it is determined in the step S406 that preliminary photographing is not to be performed, and the process proceeds directly to the step S409, the system controller 50 sets and stores the end point 503 in panoramic photography according to a user's instruction input by using the operation section 70.

Referring again to FIG. 3, when the panoramic photographing view angle-setting process in the step S301, described with reference to FIGS. 4 and 5, is terminated, the system controller 50 proceeds to a step S302.

In the step S302, the system controller 50 calculates an angle of view of one image acquired by one photographing operation based on the focal length of the photographic lens 103.

Assuming that a width of the image capturing section 22 is represented by w [mm], and the focal length of the photographic lens 103 is represented by f [mm], the angle of view θ [°] is expressed by the following equation (1):

$$\theta[°] = \tan^{-1}(w[mm] \div 2 \div f[mm]) \times \frac{360}{\pi} \quad (1)$$

Figure 6:
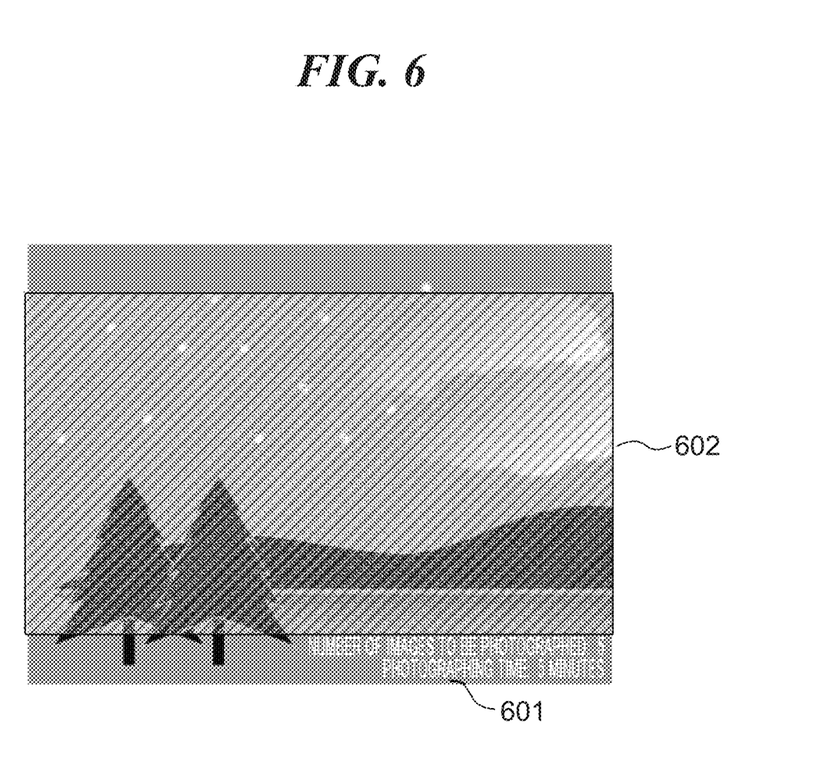
FIG. 6 is a view useful in explaining a method of displaying an photographing condition, calculated and displayed in a step in FIG. 3, and a combining effective angle of view, calculated and displayed in a step in FIG. 3.

In a step S303, the system controller 50 calculates the minimum number of images to be photographed and the shortest photographing time to complete the starlit-sky panoramic photography, which are required to satisfy the panoramic photographing angle of view set in the step S301, and displays the number and the time on a notification display area 601 of the display section 28, as shown in FIG. 6. Note that the minimum number of images to be photographed refers to the number of images to be photographed in a case where the overlapping area between each adjacent ones of photographed images is narrowed as much as possible, and is calculated by dividing the panoramic photographing angle of view 501, which is set in the step S301, by the angle of view, which is calculated in the step S302. Further, the shortest photographing time is calculated by multiplying the exposure time required to photograph one image in the starlit-sky panoramic photography mode and the minimum number of images to be photographed. Note that in a case where black subtraction photographing is performed separately from main photographing, the time for the black subtraction photographing may be included in the shortest photographing time displayed on the display section 28. Further, although in the step S303, the minimum number of images to be photographed and the shortest photographing time are calculated and both of the calculated values are displayed on the display section 28, the position and method of displaying these values are not limited to the display shown in FIG. 6. For example, only one of the minimum number of images to be photographed and the shortest photographing time may be displayed on the notification display area 601.

Then, in a step S304, the system controller 50 determines whether or not the number of images to be photographed and/or the photographing time (photographing condition) displayed on the notification display area 601 has/have been selected by the user. More specifically, in a case where a touch of the user on the notification display area 601 has not been detected after the notification display area 601 has been displayed in the step S303 until a predetermined time period elapses, the system controller 50 determines that the above-mentioned selection has been performed. Note that in the present embodiment, the number of images to be photographed and/or the photographing time, displayed on the notification display area 601 of the display section 28, are/is displayed such that the value(s) can be changed by a touch of the user. Further, in a case where this change of the value(s) has been made, the system controller 50 determines that the changed number of images to be photographed and/or the changed photographing time has/have been selected by the user.

Then, in a step S305, the system controller 50 displays a hatched area 602 having a height indicative of a combining effective angle of view on the display section 28 according to the number of images to be photographed and/or the photographing time, which are displayed on the notification display area 601, such that the hatched area 602 is superimposed on the through image. The combining effective angle of view refers to an angle of view orthogonal to the direction of the panning, which can be used in combining images into a panoramic image, and is changed by deforming the image in geometric deformation processing performed according to the focal length of the photographic lens 103 so as to align images to be combined into a panoramic image and improve the accuracy of combining the images. That is, in the step S305, the angle of view orthogonal to the direction of the panning, before and after the change, is displayed on the display section 28 such that the user can visually recognize the angle of view orthogonal to the direction of the panning.

A height h' [pix] indicative of the combining effective angle of view is calculated as expressed by the following equation (2). In this equation, φ [°] represents an angle (angle of view) per one photographed image, which is obtained by dividing the panoramic photographing angle of view 501 set in the step S301 by the number of images to be photographed, which is selected in the step S304. Further, h [pix] represents the number of pixels to be captured in a direction of the height.

$$h'[pix] = h[pix] \times \cos\frac{\varphi}{2} \quad (2)$$

The height of the hatched area 602 on the display section 28 can be calculated by applying the number of pixels in the height direction of the display section 28 to h of the equation (2).

Then, in a step S306, the system controller 50 acquires a photographing start instruction. If the user can confirm that the hatched area 602 indicative of the combining effective angle of view, which is displayed in the step S305, is a desired one, the user inputs a photographing start instruction by operating the operation section 70.

Then, in a step S307, the system controller 50 determines whether or not the photographing start instruction has been received in the step S306. If it is determined that the photographing start instruction has been received, the system controller 50 proceeds to a step S308. If it is determined that no photographing start instruction has been received, the system controller 50 returns to the step S304.

Figure 7:
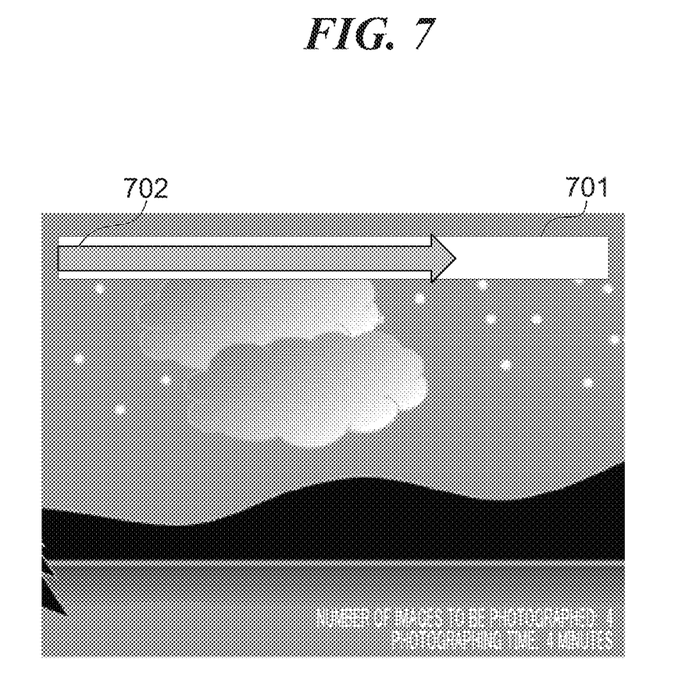
FIG. 7 is a view showing an example of display of an amount of panning displayed in steps in FIG. 3.

Then, in the step S308, the system controller 50 calculates an amount of panning required to shift the digital camera 100 to the next photographing operation, and displays the calculated amount of panning in a bar 701, as shown in FIG. 7. Here, the required amount of panning refers to an amount of movement of the main body of the digital camera 100, which should occur when the main body of the digital camera 100 is panned from the position in the step S308 to a position where the next still image is to be photographed in the step S311, referred to hereinafter. Note that in a case where the photographing range of the digital camera 100 at a time when the process proceeds from the step S307 to the step S308 corresponds to the angle of view at the start of panoramic photography, i.e. in a case where the main body of the digital camera 100 is in a position where the first image is to be photographed, the required amount of panning is calculated to be 0 in the step S308. In this case, the bar 701 shown in FIG. 7 is not displayed.

Then, in a step S309, the detection section 80 acquires the amount of movement of the main body of the digital camera 100, and the acquired amount of movement is displayed as an arrow 702 in FIG. 7. Here, the amount of movement acquired in this step refers to an amount of movement of the position of the main body of the digital camera 100 from the position in the step S308 to the current position. With this, the user can pan the main body to a position of the next photographing while confirming the bar 701 indicative of the required amount of panning, which is displayed in the step S308, and the arrow 702 indicative of the amount of movement, which is displayed in the step S309.

Then, in a step S310, the system controller 50 calculates the remaining required amount of panning, which is calculate by subtracting the amount of movement acquired in the step S309 from the required amount of panning calculated in the step S308, and determines whether or not the remaining required amount of panning is equal to 0. In this determination, when the front end of the arrow 702 reaches the right end of the bar 701 in FIG. 7, the remaining required amount of panning is equal to 0. If it is determined that the remaining required amount of panning is equal to 0, the system controller 50 proceeds to the step S311. If it is determined that the remaining required amount of panning is not equal to 0, the system controller 50 returns to the step S309, and continues to acquire and display the amount of movement. Note that in a case where the user erroneously continues panning even after it is determined that the remaining required amount of panning is equal to 0, a notification of "Pan the camera in the opposite direction." may be displayed on the screen shown in FIG. 7.

Note that in the steps S308 to S310, calculation of the required amount of panning and acquisition of the amount of movement of the main body of the digital camera 100 are performed, and the bar 701 and the arrow 702 indicative of these amounts are displayed on the display section 28. However, the display position and the display method are not limited to those shown in FIG. 7. That is, it is only required to enable the user to confirm, through display on the display section 28, whether or not the main body of the digital camera 100 has been panned by the required amount of panning before shifting to the next photographing. For example, a ratio of the remaining required amount of panning, which is calculated in the step S310, to the required amount of panning, which is calculated in the step S308, may be displayed in percentage.

Then, in the step S311, a notification of "Photography can be performed. Stop panning and press the image capturing button." is displayed on the screen shown in FIG. 7. If the user fully presses the shutter button 61 after displaying this notification, it is determined that a photographing instruction has been input (YES to a step S312), the system controller 50 proceeds to a step S313.

Then, in the step S313, a photographing operation is started. This photographing operation is for long time-exposure photography, and hence a notification of "Photographing operation is in progress." is displayed on the screen shown in FIG. 7. This makes it possible to prevent the user from erroneously moving the digital camera 100 during this photographing operation.

Then, if it is determined that the photographing operation started in the step S313 has been terminated (YES to a step S314), the system controller 50 proceeds to a step S315.

Then, in the step S315, the system controller 50 updates the remaining number of images to be photographed and/or remaining photographing time in accordance with termination of the photographing operation started in the step S313. At this time, the display on the notification display section 601 is also updated.

Then, in a step S316, the system controller 50 determines whether or not the photographing operation terminated immediately before is one for photographing any of the second and subsequent images. If it is determined that the terminated photographing operation is one for photographing any of the second and subsequent images, the system controller 50 proceeds to the step S317. If it is determined that the photographing operation is not one for photographing any of the second and subsequent images, i.e. one for photographing the first image, the system controller 50 returns to the step S308 to start the next photographing operation.

Then, in the step S317, the system controller 50 combines the two images. In the first combining processing, the system controller 50 combines the first and second images acquired by photographing. In the second or subsequent time combining processing, the system controller 50 combines the combined image obtained by the combining processing in the preceding step S317 and an image photographed immediately before.

Then, in a step S318, the system controller 50 determines whether or not the number of photographed images has reached the required number of images to be photographed. If it is determined that the number of photographed images has reached the required number of images to be photographed, the present process is terminated. If it is determined that the number of photographed images has not reached the required number of images to be photographed, the system controller 50 returns to the step S308 to start the next photographing operation.

In the present embodiment, the hatched area 602 having the height indicative of the combining effective angle of view is displayed in the step S305 according to the number of images to be photographed and/or the photographing time, selected by a user. However, the configuration may be such that a user is capable of changing the combining effective angle of view itself. In this case, the number of images to be photographed and/or the photographing time are/is calculated according to the combining effective angle of view changed by the user, and the calculated number of images to be photographed and/or photographing time are/is displayed on the notification display section 601 of the display section 28.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-161686 filed Aug. 30, 2018, which is hereby incorporated by reference herein in its entirety.

What is claimed is:

1. An image capture apparatus that performs predetermined panoramic photography in which a plurality of images acquired by repeating still image capturing with long time-exposure and panning are combined, comprising:
   at least one memory that stores a set of instructions; and
   at least one processor that executes the instructions, the instructions, when executed, causing the image capture apparatus to perform operations comprising:
   setting a first angle of view in a direction of the panning, which indicates an angle from a start point to an end point in the predetermined panoramic photography;
   calculating a photographing condition in the predetermined panoramic photography based on the first angle of view and a focal length of a photographic lens;
   displaying the photographing condition such that the photographing condition can be changed by a user;
   performing, when combining the plurality of images, geometric deformation processing thereon, for changing a second angle of view which indicates an angle of view in a direction orthogonal to the direction of the panning, according to the focal length of the photographic lens;
   calculating the second angle of view after the change to be performed by the geometric deformation processing according to the set first angle of view and the displayed photographing condition; and
   displaying the second angle of view before and after the change.

2. The image capture apparatus according to claim 1, wherein an angle of view, which is set by the user, is set as the first angle of view.

3. The image capture apparatus according to claim 1, wherein the first angle of view is set based on the start point and the end point, which are set by the user.

4. The image capture apparatus according to claim 3, wherein the start point is set by the user based on an image acquired by preliminary photographing.

5. The image capture apparatus according to claim 3, wherein the end point is set by the user based on an image acquired by preliminary photographing.

6. The image capture apparatus according to claim 1, wherein the photographing condition is at least one of the number of the plurality of images and a photographing time of the predetermined panoramic photography.

7. The image capture apparatus according to claim 1, wherein the predetermined panoramic photography is starlit-sky panoramic photography.

8. The image capture apparatus according to claim 1, wherein the operations performed by the image capture apparatus further comprise:
   calculating a required amount of panning indicative of an amount of movement of a main body, which is required to perform panning from a position of a first operation of the still image capturing to be executed to acquire one of the plurality of images to a position of a second operation of the still image capturing to be executed next, in the predetermined panoramic photography,
   acquiring an amount of movement of the main body moved by panning started by the user after the required amount of panning is calculated,
   notifying the user that the second operation of the still image capturing can be executed when the acquired amount of movement of the main body reaches the calculated required amount of panning, and
   executing the second operation of the still image capturing when a photographing instruction is received from the user after said notifying.

9. A method of controlling an image capture apparatus that performs predetermined panoramic photography in which a plurality of images acquired by repeating still image capturing with long time-exposure and panning are combined, comprising:
   setting a first angle of view in a direction of the panning, which indicates an angle from a start point to an end point in the predetermined panoramic photography;

calculating a photographing condition in the predetermined panoramic photography based on the first angle of view and a focal length of a photographic lens;

displaying the photographing condition such that the photographing condition can be changed by a user;

performing, when combining the plurality of images, geometric deformation processing thereon, for changing a second angle of view which indicates an angle of view in a direction orthogonal to the direction of the panning, according to the focal length of the photographic lens;

calculating the second angle of view after the change to be performed by the geometric deformation processing according to the set first angle of view and the displayed photographing condition; and displaying the second angle of view before and after the change.

10. A non-transitory computer-readable storage medium storing a computer-executable program for executing a method of controlling an image capture apparatus that performs predetermined panoramic photography in which a plurality of images acquired by repeating still image capturing with long time-exposure and panning are combined, wherein the method comprises:

setting a first angle of view in a direction of the panning, which indicates an angle from a start point to an end point in the predetermined panoramic photography;

calculating a photographing condition in the predetermined panoramic photography based on the first angle of view and a focal length of a photographic lens;

displaying the photographing condition such that the photographing condition can be changed by a user;

performing, when combining the plurality of images, geometric deformation processing thereon, for changing a second angle of view which indicates an angle of view in a direction orthogonal to the direction of the panning, according to the focal length of the photographic lens;

calculating the second angle of view after the change to be performed by the geometric deformation processing according to the set first angle of view and the displayed photographing condition; and displaying the second angle of view before and after the change.

11. An image capture apparatus that performs predetermined panoramic photography in which a plurality of images are acquired, comprising:

at least one memory that stores a set of instructions; and at least one processor that executes the instructions, the instructions, when executed, causing the image capture apparatus to perform operations comprising:

setting a first angle of view in a direction of the panning, which indicates an angle from a start point to an end point in the predetermined panoramic photography;

calculating a photographing condition in the predetermined panoramic photography based on the first angle of view;

displaying the photographing condition such that the photographing condition can be changed by a user;

performing, when combining the plurality of images, geometric deformation processing thereon, for changing a second angle of view which indicates an angle of view in a direction different with the direction of the panning, according to a focal length of a photographic lens;

calculating the second angle of view after the change to be performed by the geometric deformation processing according to the set first angle of view; and displaying the second angle of view after the change.

12. A method of controlling an image capture apparatus that performs predetermined panoramic photography in which a plurality of images are acquired, comprising:

setting a first angle of view in a direction of the panning, which indicates an angle from a start point to an end point in the predetermined panoramic photography;

calculating a photographing condition in the predetermined panoramic photography based on the first angle of view;

displaying the photographing condition such that the photographing condition can be changed by a user;

performing, when combining the plurality of images, geometric deformation processing thereon, for changing a second angle of view which indicates an angle of view in a direction different with the direction of the panning, according to a focal length of a photographic lens;

calculating the second angle of view after the change to be performed by the geometric deformation processing according to the set first angle of view; and displaying the second angle of view after the change.

13. A non-transitory computer-readable storage medium storing a computer-executable program for executing a method of controlling an image capture apparatus that performs predetermined panoramic photography in which a plurality of images are acquired, comprising:

setting a first angle of view in a direction of the panning, which indicates an angle from a start point to an end point in the predetermined panoramic photography;

calculating a photographing condition in the predetermined panoramic photography based on the first angle of view;

displaying the photographing condition such that the photographing condition can be changed by a user;

performing, when combining the plurality of images, geometric deformation processing thereon, for changing a second angle of view which indicates an angle of view in a direction different with the direction of the panning, according to a focal length of a photographic lens;

calculating the second angle of view after the change to be performed by the geometric deformation processing according to the set first angle of view; and displaying the second angle of view after the change.

* * * * *